United States Patent
Somogyi et al.

(10) Patent No.: US 7,673,690 B2
(45) Date of Patent: Mar. 9, 2010

(54) METHOD AND APPARATUS FOR DYNAMIC APPLICATION MANAGEMENT IN SUB-SEA WELL INSTALLATIONS

(75) Inventors: Tibor Somogyi, Verrières le Buisson (FR); Jack Booker, Aberdeen (GB); Yutaka Imasato, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 523 days.

(21) Appl. No.: 10/595,223

(22) PCT Filed: Sep. 22, 2004

(86) PCT No.: PCT/EP2004/010658

§ 371 (c)(1),
(2), (4) Date: Mar. 27, 2006

(87) PCT Pub. No.: WO2005/041031

PCT Pub. Date: May 6, 2005

(65) Prior Publication Data

US 2007/0088505 A1    Apr. 19, 2007

(30) Foreign Application Priority Data

Oct. 7, 2003   (EP)   ................... 03292469

(51) Int. Cl.
*E21B 29/12* (2006.01)

(52) U.S. Cl. .................. 166/338; 166/336; 166/250.15; 702/6; 340/853.3

(58) Field of Classification Search .................. 166/335, 166/337, 338, 53, 336, 254.2, 250.01, 250.15; 702/6, 13; 340/853.1, 856.4
See application file for complete search history.

(56) References Cited

U.S. PATENT DOCUMENTS

| | | | |
|---|---|---|---|
| 5,941,305 A | 8/1999 | Patton et al. | |
| 6,188,327 B1 * | 2/2001 | Cousins et al. | ........... 340/853.9 |
| 6,202,208 B1 | 3/2001 | Holiday, Jr. | |
| 6,422,315 B1 | 7/2002 | Dean | |
| 6,622,799 B2 * | 9/2003 | Dean | ........................... 166/381 |
| 6,923,273 B2 * | 8/2005 | Terry et al. | .................... 175/45 |
| 7,261,162 B2 * | 8/2007 | Deans et al. | ................. 166/336 |
| 2001/0049726 A1 * | 12/2001 | Comeau et al. | ............. 709/218 |
| 2002/0159439 A1 | 10/2002 | Marsh et al. | |
| 2002/0174010 A1 | 11/2002 | Rice | |
| 2002/0180798 A1 | 12/2002 | Mahoney et al. | |
| 2003/0066059 A1 * | 4/2003 | Moon et al. | .................. 717/148 |
| 2004/0262008 A1 * | 12/2004 | Deans et al. | ................. 166/339 |
| 2007/0107907 A1 * | 5/2007 | Smedstad et al. | ........... 166/357 |

FOREIGN PATENT DOCUMENTS

WO    WO0236936    5/2002

* cited by examiner

*Primary Examiner*—Thomas A Beach
(74) *Attorney, Agent, or Firm*—Darla P. Fonseca; Jaime Castano

(57) ABSTRACT

A method for updating a software of a sub-sea controller (31) located under the sea level. The sub-sea controller manages a plurality of tools in a sub-sea well. An application module (35) is downloaded into the sub-sea controller. The application module is executed using a virtual machine (36) implemented within the sub-sea controller.

12 Claims, 4 Drawing Sheets

METHOD AND APPARATUS FOR DYNAMIC APPLICATION MANAGEMENT IN SUB-SEA WELL INSTALLATIONS

BACKGROUND OF INVENTION

1. Field of the Invention

The invention generally relates to a sub-sea controller in a sub-sea well installation.

2. Background Art

A downhole installation for extracting oil or gas usually comprises a plurality of tools. The plurality of tools may for example comprise a sensor used for measuring a parameter such as temperature, pressure or flow rate, an actuator, e.g., a pump or a valve. A controller located at a surface of the downhole installation communicates with the tools. In case the downhole installation is located under the sea level, it is understood that the surface is in fact a border between the water and an earth formation. In this latter case, the sub-sea controller may be installed at a relatively deep location of the sea and may thus be difficult to access.

FIG. 1 provides an illustration of a sub-sea well installation. A surface controller or a computer 14 located above the sea level communicates with a sub-sea controller 11 located under the sea level, using a dedicated channel, e.g., a single cable 12. The sub-sea controller 11 is protected from water and pressure by a canister 13. The sub-sea controller 11 also communicates with a plurality of tools. As an example, the plurality of tools comprises a pressure sensor 15a, a pump 15b and a thermometer 15c. The pump 15b may be located within a casing of the sub-sea well 19. The pressure sensor 15a and the thermometer 15c may be located at a neighborhood of a formation 18.

In a sub-sea environment, it may happen that communication between the computer 14 and the sub-sea controller 11 is temporally interrupted. For example, a communicating device like a modem (not represented) may be shut off by a circuit breaker (not represented) and cause the sub-sea controller 11 to be isolated from the computer 14. The sub-sea controller 11 may however continue to communicate with the plurality of tools. Hence, a native application is implemented directly within the sub-sea controller 11.

The native application comprises a plurality of tasks. The sub-sea controller 11 executes the tasks. For example the sub-sea controller 11 requests and receives values of the measured pressure and temperature from the pressure sensor 15a and the thermometer 15c. The sub-sea controller 11 also outputs orders to the pump 15b.

Furthermore, the sub-sea controller 11 may execute a conditional order. A conditional order is executed only if a condition is fulfilled. For example, if a measured pressure is below a predefined threshold, the pump 15b may be activated to provide a better extraction of oil or gas. The sub-sea controller 11 sends a request to the pressure sensor 15b to obtain the value of the pressure and compares the value of the pressure to the predetermined threshold. If the value of the pressure is smaller than the predetermined threshold, the sub-sea controller 11 sends a command to the pump 15a instructing the pump 15a to activate itself.

The sub-sea controller 11 may also execute a task for a purpose of statistics. An example of task for a purpose of statistics may be to count how many times the temperature parameter reaches a second predefined threshold during a period of time. In this case, the sub-sea controller 11 regularly receives the value of the measured temperature from the thermometer 15c during the period of time and compares the value of the measured temperature to a second threshold. If the value of the measured temperature reaches the second predefined threshold, a local variable may be incremented.

The sub-sea controller 11 executes the plurality of tasks to manage the plurality of tools. The sub-sea controller 11 stores the values of the parameters received from the plurality of tools or any other data, e.g., the local variable, into a storage device (not represented) such as a hard disk, or into an internal memory (not represented), e.g., a RAM memory, or an EEPROM memory.

The computer 14 only reads the internal memory. If the computer and the sub-sea controller 11 are temporally unable to communicate, the sub-sea controller 11 continues to execute the native application and stores the data into the internal memory. When the communication between the computer 14 and the sub-sea controller 11 is reestablished, the internal memory may be read by the computer 14.

The sub-sea controller 11 is installed under the sea level and manages the tools for a relatively extended life-time, typically several years. There may be a need for adding a new tool to the well, and as a consequence, the managing software of the sub-sea controller 11 may need to be updated to take into account the new tool. There may also be a need for modifying the managing software during the life-time for any reason. For example, the predetermined threshold may need to be changed, a conditional loop may be added, or a driver managing an additional tool may be needed. According to prior art, such an update is performed by replacing the managing software. This may be done by erasing the flash memory of the sub-sea controller 11, and downloading a new application to be stored in the flash memory and run from the flash memory.

FIG. 2 contains an illustration of an updating operation according to prior art. The sub-sea controller 21 usually comprises a plurality of devices (not represented) such as a Central Processing Unit, the flash memory, a timer, a plurality of Input/Output ports etc. forming a hardware layer 22. An operating system layer 23 links the hardware layer 22 to the applications. A native application 24 is run above the operating system layer 23. To update a software of the sub-sea controller 21, a new application 25 is downloaded and replaces the native application 24. During the downloading, the sub-sea controller 21 is unable to execute any application and the tools are not managed.

SUMMARY OF INVENTION

In a first aspect the invention provides a method for updating a software of a sub-sea controller located under the sea level. The sub-sea controller manages a plurality of tools in a sub-sea well. An application module is downloaded into the sub-sea controller. The application module is executed using a virtual machine implemented within the sub-sea controller.

In a first preferred embodiment, a native application of the sub-sea controller is executed within the sub-sea controller and a native interface is executed within the sub-sea controller. The method further comprises accessing the native interface from the native application to exchange data with the application module.

In a second preferred embodiment, a native application of the sub-sea controller is executed within the sub-sea controller and a native interface is executed within the sub-sea controller. The method further comprises accessing the native interface from the application module to exchange data with the native application.

In a third preferred embodiment, the downloading and the executing of the application module are performed without interrupting an executing of the native application of the sub-sea controller.

In a fourth preferred embodiment, the application module is executed in a defined memory, and the native application is executed in a native memory. The defined memory is distinct from the native memory.

In a fifth preferred embodiment, the application module contains a driver for a tool.

In a second aspect the invention provides a sub-sea controller located under the sea level for managing a plurality of tools in a sub-sea well installation. The sub-sea controller comprises downloading means to download an application module to the sub-sea controller. A virtual machine executes the downloaded application module.

In a sixth preferred embodiment, the sub-sea controller further comprises a native application implemented within the sub-sea controller and a native interface implemented within the sub-sea controller. The native interface enables the application module to access the native application.

In a seventh preferred embodiment the native interface enables the native application to access the application module.

In an eighth preferred embodiment, the sub-sea controller further comprises a native memory wherein the native application is executed and a defined memory wherein the application module is executed. The defined memory is distinct from the native memory.

In a ninth preferred embodiment, the sub-sea controller further comprises a protection register and accessing means to access the protection register from the application module. The protection register authorizes an access to the native application only if a key code is written hereinto.

In a third aspect the invention provides a sub-sea well installation comprising a sub-sea controller. The sub-sea controller comprises downloading means to download an application module to the sub-sea controller. A virtual machine executes the downloaded application module.

Other aspects and advantages of the invention will be apparent from the following description and the appended claims.

DETAILED DESCRIPTION

In a well that is not located under an isolating layer such as the sea, a controller that manages the tools may be located at ground surface, i.e. close to the computer. The communication between the controller and the computer may typically be performed with an Ethernet connection having a relatively large bandwidth, e.g., a bandwidth of 100 Mbps. The bandwidth has a significant effect on a duration of a download from the computer to the controller. As an example, for an application that has a size of about 1 MB, a download time may be approximately one tenth of second. During this download time, the controller is stopped and management of the tools may be interrupted. Since certain values of the parameters may generally be read by the controller every second, i.e., in a time period that is relatively large as compared to the download time, the replacement of the application in the controller by a new application generates minor inconveniences only. In most cases the replacement of the application has no significant effect on the reading of parameters.

In a sub-sea well installation, the communication between the computer and the sub-sea controller may be substantially slower: a standard bandwidth may be 9600 bauds. It may take a number of minutes, e.g., 15 minutes to download a 1 MB application from the computer to the sub-sea controller. Since the sub-sea controller is stopped during the downloading, a variable number of values of each parameter may not be recorded while the controller downloads the application. Furthermore, the tools, e.g., the actuators may not be controlled during the downloading. In order to avoid a situation in which the actuators remain uncontrolled, the sub-sea well installation may need to be stopped before every updating of the application in the controller.

The invention enables to update a software of the sub-sea controller without any loss of data, and avoids stopping of the sub-sea well installation.

Figure 1:
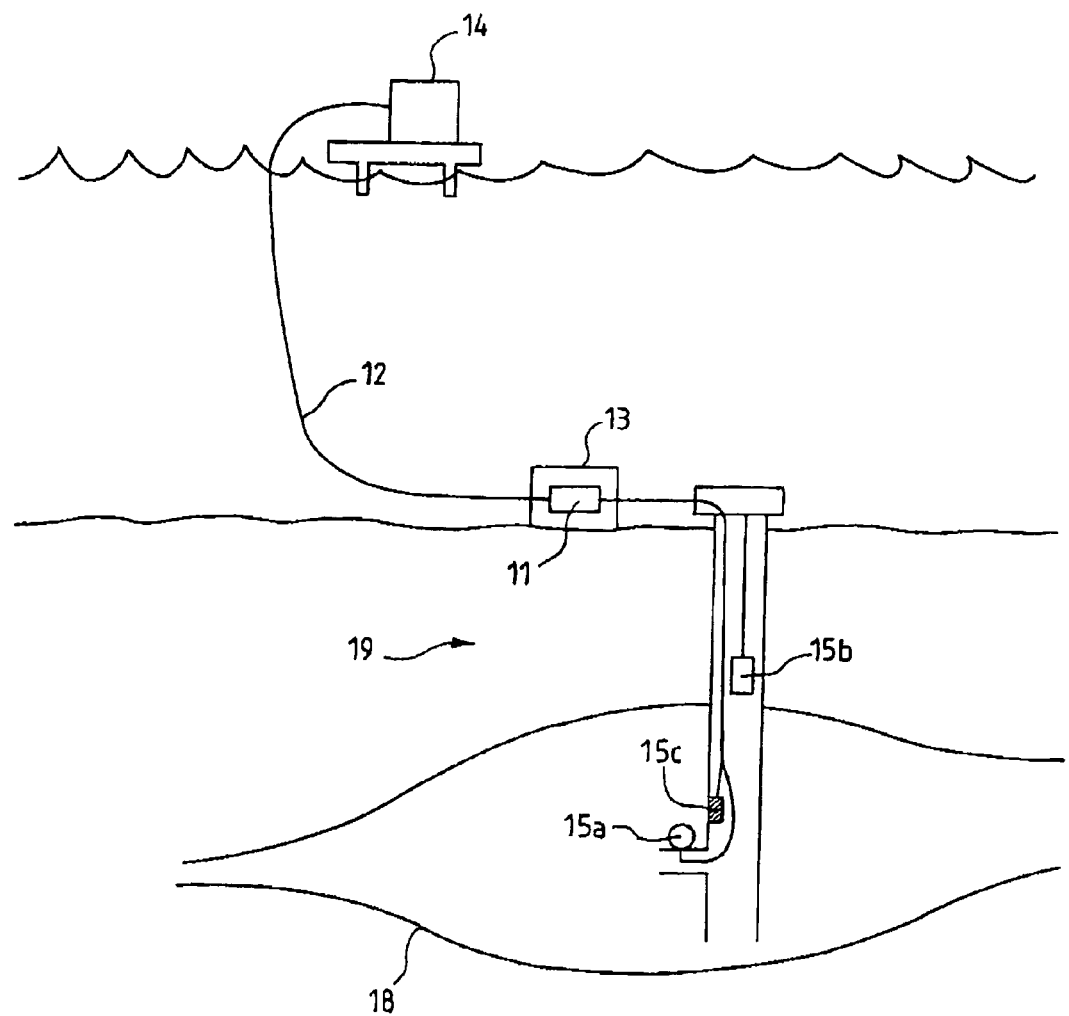
FIG. 1 contains an illustration of a sub-sea well installation.
Figure 2:
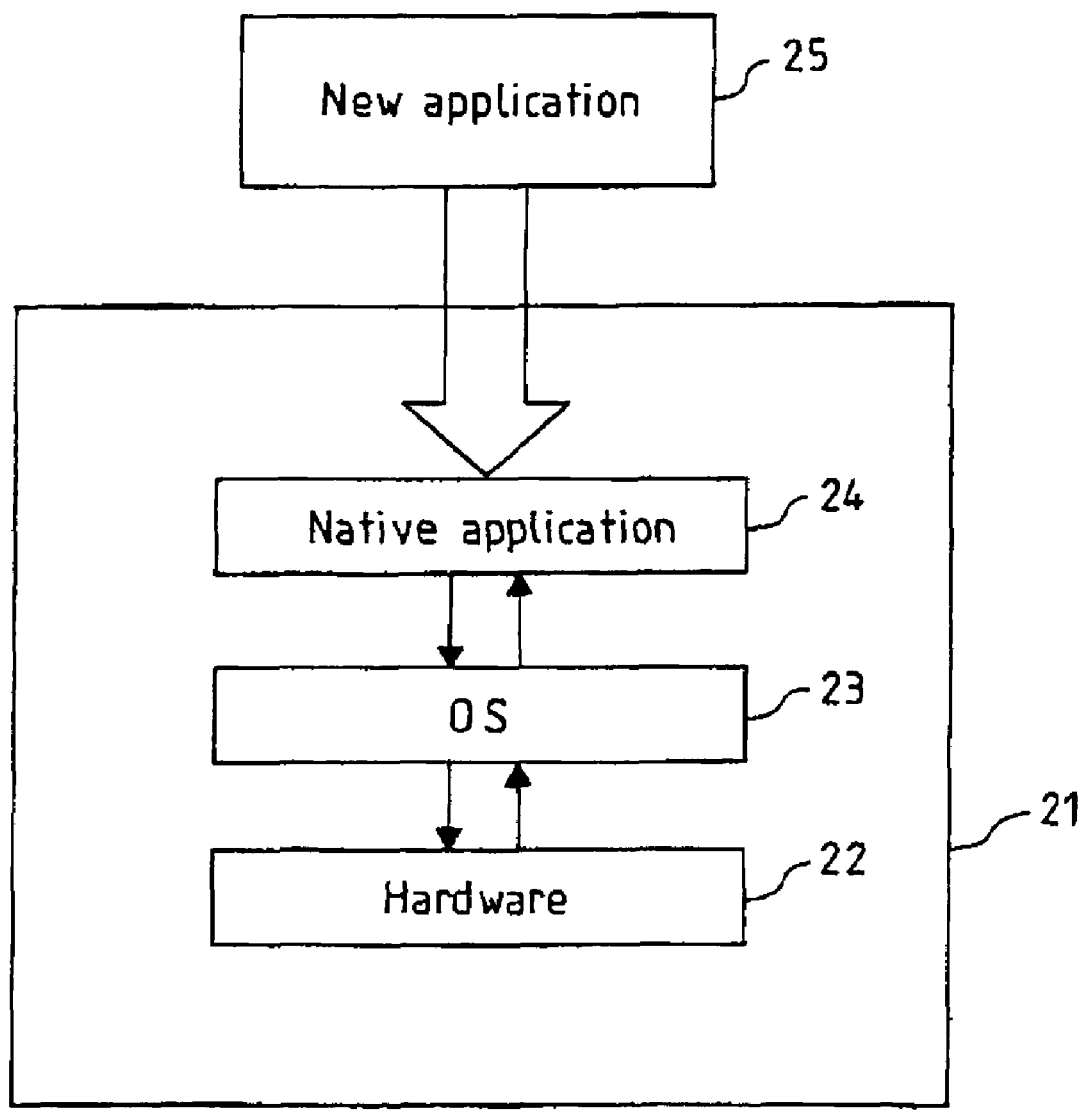
FIG. 2 contains an illustration of an updating operation according to prior art.
Figure 3:
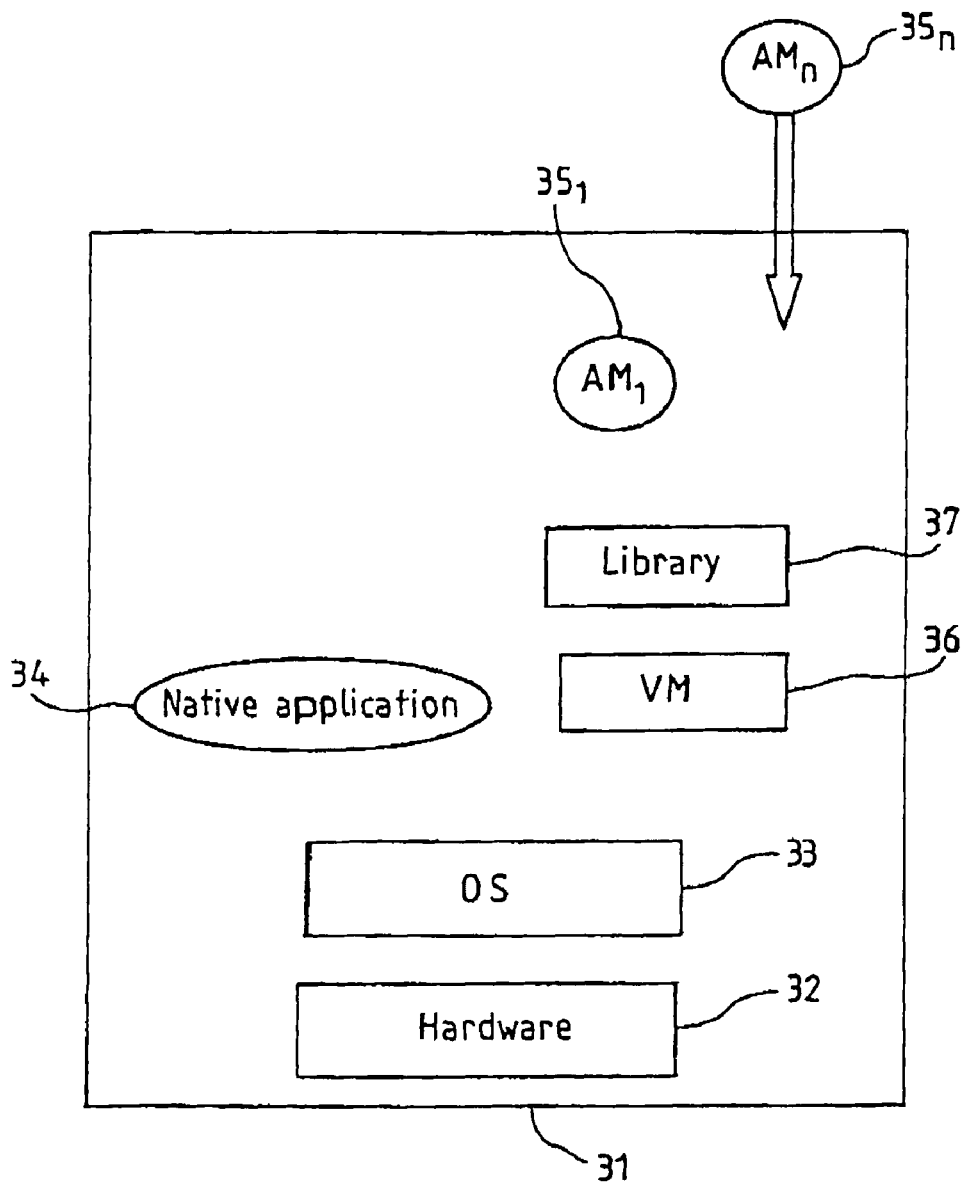
FIG. 3 shows a block diagram of a sub-sea controller according to the present invention.

FIG. 3 contains a block diagram of a sub-sea controller 31 according to the present invention. The sub-sea controller 31 comprises a hardware layer 32 and an operating system layer 33. A native application 34 is executed to manage the tools during the life-time of the sub-sea controller 31. Under normal operating circumstances, the native application 34 may not need to be replaced during the life-time. Therefore, the native application 34 may be stored in a permanent memory such as a Read Only Memory (not shown in FIG. 3). However, it is possible in another embodiment that the native application be stored in a flash memory or any other type of memory. If there is a need during the life-time of the sub-sea controller 31 for adding a new tool or a new functionality, a software of the sub-sea controller 31 is updated. The updating is performed according to the invention by downloading an application module $35_n$ from a programming device, e.g. the computer, to the sub-sea controller 31. The application module $35_n$ contains an interpretable code and may be interpreted by the virtual machine 36, using a library 37. Application modules $35_1$, ... that may have been downloaded at an earlier updating may possibly be executed by the virtual machine 36, during the downloading of the application module $35_n$, and continue to be executed after the download and execution of the application module $35_n$. The library 37 enables the virtual machine 36 to interpret the application module $35_n$; it contains a set of descriptions of functions and variables to be used by the executed application module $35_n$; hence the application module $35_n$ does not need to include the descriptions of the functions and the variables that are used. The application module $35_n$ may therefore have a reduced size.

While the applications modules $35_1$, ... $35_n$ are executed by the virtual machine 36, the native application 34 remains in memory and continues to be run during the update. The parameters from the tools may continue to be continuously read and stored into the internal memory of the sub-sea controller 31 and the tools remain controlled during the update.

Furthermore, the application module $35_n$ contains only the new additional application and may thus be substantially smaller in size than the native application: typically, the application module $35_n$ may be 10 or 20 kilobytes long. Using a 9600 bauds connection to the computer, the application module $35_n$ takes approximately 10 or 20 seconds to download to the sub-sea controller 31. The available bandwidth between the computer and the sub-sea controller 31 may be less sollicitated by the downloading than in prior art and hence more bandwidth is made available for other purposes.

Following the update of the software of the sub-sea controller 31, both the native application 34 and the application modules $35_1, \ldots, 35_n$ are executed.

Figure 4:
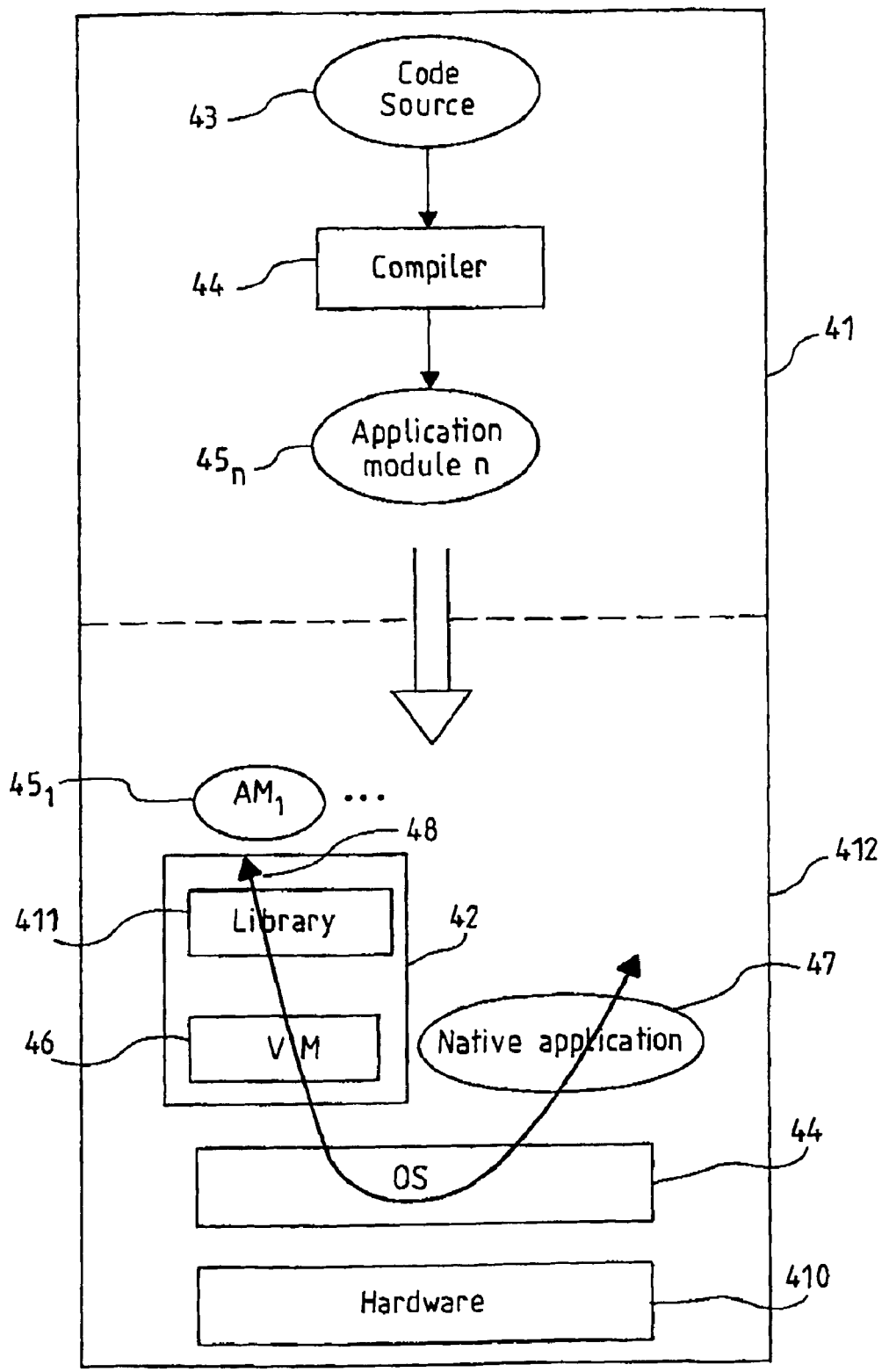
FIG. 4 shows a block diagram illustrating an example embodiment of the invention.

FIG. 4 contains a block diagram of an example embodiment of the invention. An application module 45 corresponding to a new additional application is developed in a development environment 41. In a preferred embodiment, a source code 43, written in a standard programming language is compiled by a compiler 44 that generates the application module $45_n$. The development environment 41 may be a Personal Computer or a Workstation for example. The generated application module $45_n$ contains an interpretable code.

The application module $45_n$ is then downloaded into the sub-sea controller 412. The sub-sea controller 412 comprises a hardware layer 410, an operating system layer 44 and a native application 47. The downloaded applications modules $45_1, \ldots, 45_n$ are executed in a run-time environment 42 comprising a virtual machine 46 and a library 411. The virtual machine 46 interprets the application module $45_n$ using the library 411.

In one example embodiment, the sub-sea well installation contains two thermometers. A first and a second thermometers measure a temperature value respectively at a first zone and a second zone of a borehole. A first task is included in a code of the native application 47. The first task compares the value of a first temperature measured at the first thermometer to a first threshold value. The first task increments a first local variable if the value of the first temperature is greater than the first threshold value.

During the life-time of the sub-sea well, there may be a need for statistics over the values of the temperature measured at a second thermometer. A second task may have to be implemented. The second task may be very similar to the first task, e.g., the value of a second temperature measured at the second thermometer may be compared to a second threshold value. The second task increments a second local variable if the value of the second temperature is greater than the second threshold value. According to the invention, the application module $45_n$ corresponding only to the second task is developed in the development environment 41. The application module $45_n$ is downloaded into the sub-sea controller 412 and interpreted by the virtual machine 46. The sub-sea controller 412 also continues executing the first task. Hence statistics over the values of temperature measured at both thermometers are performed.

In the updating of the software of the sub-sea controller 412 according to prior art, a developer is required generally to produce a new native application by modifying the existing native application. For example, the developer has to include a code corresponding to a new additional task to the native application. This requires a relatively good knowledge of the native application 47. Furthermore, the developer has to entirely debug the modified native application. In an updating operation according to the present invention, only the application module $45_n$ corresponding to the new task needs to be developed. This is substantially easier and less time consuming than modifying the entire native application.

In a preferred embodiment of the present invention, the native application 47 may be executed within a native memory (not represented), and the application modules $45_1, \ldots 45_n$ may be run within a defined memory (not represented) distinct from the native memory in order to protect the native application 47 from a code error. In the method from prior art, the native application 47 needs to be modified in order to include any new software. If the modified native application includes code errors, such as an infinite loop, the controller may not be able to work. The invention enables to develop only the application module $45_n$ corresponding to the new task. The application modules $45_1, \ldots 45_n$ and the native application 47 are executed within two separate memories. Hence a risk of encountering errors related to executing a modified native application 47 is eliminated. If the application module $45_n$ corresponding to the new task includes an infinite loop, the native application remains unaffected.

Furthermore, the downloading may be secured in this embodiment so as to avoid a non-authorized person replacing or modifying an application module.

In the preferred embodiment, the application modules $45_1, \ldots 45_n$ and the native application 47 are executed within two distinct memories. However, the application modules $45_1, \ldots 45_n$ may be allowed to access the native application 47. The second task of the example described above comprises incrementing the second local variable every time the value of the temperature measured at the second thermometer is beyond the second threshold value. The corresponding application module $45_n$ needs to access the temperature data measured at the second thermometer. In this example, the second thermometer may be managed in the native application 47: there is thus a need for accessing the native application 47 to run the second task. A native interface 48 enables the application modules $45_1, \ldots 45_n$ to access the native application 47. The native application 47 may also be allowed to access the application modules $45_1, \ldots 45_n$.

In another example embodiment, the native application contains variable data that are stored into a flash memory, and a program. The application modules may be allowed to write in a protection register. The protection register provides a lock allowing or forbidding access to the flash memory depending on a content of the protection register. If the application module accesses the protection register and writes a key code into the protection register, the access to the flash memory may be allowed. The application module may in this latter case directly modify the variable data of the native application or even the program of the native application if it is also stored in the flash memory.

In a further example embodiment, the plurality of tools comprises a pressure sensor, a first pump and a second pump. The first and second pumps are located respectively in a first and second zone of the oil- or gas-formation. The sub-sea controller executes a native task corresponding to the native application. The sub-sea controller requests and receives values of the measured pressure from the pressure sensor. The values of the measured pressure are compared to a predetermined pressure threshold value. If the value of the measured pressure is smaller than the predetermined pressure threshold value, the first and second pumps are instructed to activate themselves. A native application may contain variable data that are stored into a flash memory, and a program. The variable data comprise a pump register. The pump register indicates which pump may be activated if the value of the measured pressure is smaller than the predetermined pressure threshold value. In this example, the pump register has a value such that only the first and second pumps may be instructed to activate themselves. During the life-time of the sub-sea controller, a quantity of fluid, e.g., oil or gas, within the second zone of the earth formation may decrease. Hence there may be a need for modifying the native task: only the first pump should be activated when measured pressure is smaller than the predetermined pressure threshold value. According to the present invention, an application module is downloaded. The application module is interpreted by the virtual machine. The application module accesses the protection register and writes the key code into the protection register. The access to the flash memory containing the variable data of the native application is thus allowed. The pump register is modified by erasing and programming at least one block of the flash memory. The pump register in the flash memory may no longer indicate that instructions may be applied to the second pump. The controller continues instructing the first pump to activate itself if the measured pressure is smaller than the predetermined pressure threshold value.

The new task corresponding to the application module in this example embodiment is to write the key code into the protection register, to erase and reprogram at least one block of the flash memory. The new task may also instruct the second pump to remain closed. The application module may thus be substantially small in size. It may take a relatively short duration to download such application module.

However, since the native application is modified, the sub-sea controller may be stopped during the relatively short duration: a relatively small number of values of pressure may not be recorded. In the updating of a software of the sub-sea controller according to prior art, a new application is downloaded. The number of values of pressure that may not be recorded may be substantially higher than in the updating of the example embodiment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A sub-sea controller located under the sea level for managing a plurality of tools in a sub-sea well installation, the sub-sea controller comprising:
   downloading means to download an application module to the sub-sea controller;
   a native application implemented within the sub-sea controller; and
   a virtual machine to execute the downloaded application module separately from the native application, wherein the downloading and the executing of the application module are performed without interrupting the executing of the native application of the subsea controller.

2. The sub-sea controller according to claim 1, further comprising:
   a native interface implemented within the sub-sea controller, the native interface enabling the application module to access the native application.

3. The sub-sea controller according to claim 2, wherein the native interface enables the native application to access the application module.

4. The sub-sea controller according to claim 2, further comprising:
   a native memory wherein the native application is executed; and
   a defined memory wherein the application module is executed, the defined memory being distinct from the native memory.

5. The sub-sea controller according to claim 2, further comprising:
   a protection register, the protection register authorizing an access to the native application only if a key code is written hereinto;
   accessing means to access the protection register from the application module.

6. The sub-sea controller of claim 1 wherein the application module contains a driver for a tool.

7. A sub-sea well installation comprising a sub-sea controller according to claim 1.

8. A method for updating a software of a sub-sea controller located under the sea level, the sub-sea controller managing a plurality of tools in a sub-sea well, the method comprising:
   executing a native application of the sub-sea controller within the sub-sea controller;
   downloading an application module into the sub-sea controller; and
   executing the application module using a virtual machine implemented within the sub-sea controller separately from the native application, wherein the downloading and the executing of the application module are performed without interrupting the executing of the native application of the subsea controller.

9. The method according to claim 8, further comprising:
   executing a native interface within the sub-sea controller;
   accessing the native interface from the native application to exchange data with the application module.

10. The method according to claim 8, further comprising:
    executing a native application of the sub-sea controller within the sub-sea controller;
    executing a native interface within the sub-sea controller;
    accessing the native interface from the application module to exchange data with the native application.

11. The method of claim 9, further comprising:
    executing the application module in a defined memory;
    executing the native application in a native memory;
    wherein the defined memory is distinct from the native memory.

12. The method of claim 8 wherein the application module contains a driver for a tool.

* * * * *